United States Patent
Schlette et al.

(10) Patent No.: US 12,485,573 B2
(45) Date of Patent: Dec. 2, 2025

(54) METHOD AND A SYSTEM FOR COLLISION AVOIDANCE OF A 3D ROBOTIC CONCRETE PRINTER

(71) Applicants: Syddansk Universitet, Odense M (DK); COBOD International A/S, Nordhavn (DK)

(72) Inventors: Christian Schlette, Odense SØ (DK); Henrik Lund-Nielsen, Nordhavn (DK)

(73) Assignees: Syddansk Universitet, Odense M (DK); COBOD International A/S, Nordhavn (DK)

( * ) Notice: Subject to any disclaimer, the term of this patent is extended or adjusted under 35 U.S.C. 154(b) by 59 days.

(21) Appl. No.: 18/697,031

(22) PCT Filed: Oct. 13, 2022

(86) PCT No.: PCT/EP2022/078467
§ 371 (c)(1),
(2) Date: Mar. 29, 2024

(87) PCT Pub. No.: WO2023/066772
PCT Pub. Date: Apr. 27, 2023

(65) Prior Publication Data
US 2025/0018598 A1    Jan. 16, 2025

(30) Foreign Application Priority Data
Oct. 20, 2021   (EP) ..................................... 21203709

(51) Int. Cl.
*B28B 1/00* (2006.01)
*B25J 9/16* (2006.01)
(Continued)

(52) U.S. Cl.
CPC ............. *B28B 1/001* (2013.01); *B25J 9/1666* (2013.01); *B28B 17/0081* (2013.01); *B33Y 10/00* (2014.12); *B33Y 50/02* (2014.12)

(58) Field of Classification Search
None
See application file for complete search history.

(56) References Cited

U.S. PATENT DOCUMENTS

| | | |
|---|---|---|
| 10,359,764 B1 | 7/2019 | Nelaturi et al. |
| 10,597,264 B1 | 3/2020 | Muck et al. |

(Continued)

FOREIGN PATENT DOCUMENTS

| | | |
|---|---|---|
| CA | 3090310 C | 5/2024 |
| CN | 110978204 A | 4/2020 |

(Continued)

OTHER PUBLICATIONS

Sustarevas, J., et al. "Task-Consistent Path Planning for Mobile 3D Printing", International Conference on Intelligent Robots and Systems, Sep. 27-Oct. 1, 2021, 8 pages.

(Continued)

*Primary Examiner* — Yung-Sheng M Tsui
(74) *Attorney, Agent, or Firm* — J. Peter Paredes; Amin Wasserman Gurnani LLP (57) ABSTRACT

The present invention concerns a system and a method for collision avoidance of a 3D robotic concrete printer, whereby the method comprises the steps of performing an application and/or manipulation process by executing instructions, such as based on G-Code, with a 3D robotic concrete printer by moving a tool in a path for applying and/or manipulating concrete material; and moving the tool in response to commands to a motion planner, said movement being assisted by a model-based collision prediction system, whereby the model-based collision-prediction sys- (Continued)

tem involves the steps of inferring and generating 3D geometries of concrete structures from applying and/or manipulating concrete structures by commanding the 3D robotic concrete printer, using the 3D geometries as a 3D collision model, which allow at any point in time to check if parts of the 3D robotic concrete printer would yield a collision when performing said movement; whereby the 3D collision model of the concrete structure is developed in parallel to the application and/or manipulation process and is updated in correspondence to the progress of the execution of the process instructions.

11 Claims, 5 Drawing Sheets

(51) Int. Cl.
  *B28B 17/00* (2006.01)
  *B33Y 10/00* (2015.01)
  *B33Y 50/02* (2015.01)

(56) References Cited

U.S. PATENT DOCUMENTS

| | | | |
|---|---|---|---|
| 10,635,076 B1* | 4/2020 | Hollander | G05B 19/402 |
| 2017/0168488 A1 | 6/2017 | Wierzynski et al. | |
| 2018/0345533 A1 | 12/2018 | Hernandez et al. | |
| 2019/0049922 A1* | 2/2019 | Schalaster | G05B 19/4099 |
| 2019/0084224 A1* | 3/2019 | Guimbretiere | B33Y 10/00 |
| 2020/0361150 A1* | 11/2020 | Levi | B33Y 10/00 |
| 2021/0034038 A1* | 2/2021 | Gay | G05B 19/4099 |
| 2022/0163943 A1* | 5/2022 | Choong | B33Y 50/00 |
| 2023/0182397 A1* | 6/2023 | Kubalak | B29C 64/236 |
| | | | 700/118 |
| 2023/0211432 A1* | 7/2023 | Steinberg | B22F 10/22 |
| | | | 219/76.14 |

FOREIGN PATENT DOCUMENTS

| | | |
|---|---|---|
| CN | 111941587 A | 11/2020 |
| CN | 212295664 U | 1/2021 |
| EP | 3318370 A2 | 5/2018 |
| EP | 3347190 A1 | 7/2018 |
| EP | 3417391 A1 | 12/2018 |
| EP | 3638472 A1 | 4/2020 |
| EP | 3638472 B1 * | 7/2021 ............ B25J 9/0078 |
| WO | 2018193088 A1 | 10/2018 |

OTHER PUBLICATIONS

WIPO/IB, International Preliminary Report on Patentability for corresponding application PCT/EP2022/078467 dated May 2, 2024, 9 pages.

WIPO/ISA/EPO, International Search Report and Written Opinion for corresponding application PCT/EP2022/078467 dated Jan. 26, 2023, 16 pages.

* cited by examiner

METHOD AND A SYSTEM FOR COLLISION AVOIDANCE OF A 3D ROBOTIC CONCRETE PRINTER

CROSS-REFERENCE TO RELATED APPLICATIONS

The present application claims priority to PCT application serial no. PCT/EP2022/078467, filed Oct. 13, 2022, which claims priority to European patent application serial no. 21203709.7, filed Oct. 20, 2021, each herein incorporated by reference in their entireties.

FIELD OF THE INVENTION

The present invention relates to a method and a system for collision avoidance of a 3D robotic concrete printer, encompassing the application of concrete, such as extrusion or printing, as well as the manipulation (post-processing) of concrete structures.

BACKGROUND OF THE INVENTION

In general, in the prior art it is known to provide means of collision detection for robotized concrete application and/or manipulation processes, but such 3D collision detection is either based on a-priori available geometries "as designed", such as global/static BIM data, or on in-situ generated geometries "as built" from local/dynamic sensor data.

WO 2019/025698 A1 discloses a cable-based parallel robot comprising a mobile tool, which is intended to be moved along a target path in a working environment. The tool, which is preferably an extrusion tool for pouring concrete, is connected via a plurality of cables and cable actuators to anchor points of a fixed structure. The cable actuators are controlled to move the tool along a target path. In WO 2019/025698 A1 there is described a model-based collision detection for cable robots as the tool is moved in order to avoid a collision of the cables with the printed concrete structures, but there is no description of using collision detection for manual control.

3D concrete printing sporadically requires pausing the printing process and to move the extrusion tool away from the currently printed structures for maintenance steps, such as cleaning. These actions are usually carried out by workers in the field who may not have sufficient understanding of machine operation and thus are in danger to accidentally drive the tool into the freshly printed structures, causing damage to the print as well as to the printer.

In regular operation, 3D concrete printing is carried out without worker interference, and a print program is sent to the 3D robotic concrete printer for automated execution. The print program is normally generated to be without collisions. However, unforeseen circumstances can still cause accidental collisions to the print as well as to the printer. Such circumstances can be workers, materials and tools in the workspace of the printer, additional installations on the printed structures, and the printing of several independently generated print programs.

Other collision scenarios can occur after the actual printing process, if the 3D robotic concrete printer setup is used for post-processing of the prints with additional manipulators, e.g. to pour material and to finish the printed surfaces.

Thus, in larger 3D printing operations, in particular within 3D concrete printing tasks, the known collision detection methods are not found satisfactory. Therefore, it is an objective of the present invention to provide an improved method and system for collision avoidance of a 3D robotic concrete printer.

SUMMARY OF THE INVENTION

In a first aspect of the present invention, there is provided a method for collision avoidance of a 3D robotic concrete printer, whereby the method comprises the steps of performing an application and/or manipulation process by executing instructions, such as based on G-Code, with a 3D robotic concrete printer by moving a tool in a path for applying and/or manipulating concrete material; and moving the tool in response to commands to a motion planner, said movement being assisted by a model-based collision prediction system; whereby the model-based collision-prediction system involves the steps of inferring and generating 3D geometries of concrete structures from applying and/or manipulating concrete structures by commanding the 3D robotic concrete printer, using the 3D geometries as a 3D collision model, which allow at any point in time to check if parts of the 3D robotic concrete printer would yield a collision when performing said movement; wherein the 3D collision model of the concrete structure is developed in parallel to the application and/or manipulation process and is updated in correspondence to the progress of the execution of the process instructions.

In a second aspect of the invention there is provided a system for collision avoidance of a 3D robotic concrete printer, said system comprising a motion planner to generate motion commands from selectable inputs, such as fully automated operation following a given program, manual operation from joysticks and similar input devices for operators, or sensor-based operation to move a tool of the printer according to sensor data; a motion controller to interpret motion commands from the motion planner for physical execution on the physical printer; and a model-based collision prediction system for testing the motion commands coming from the motion planner for collisions and allowing collision-free motion commands to be executed by the motion controller and not allowing commands that would cause a collision; wherein the model-based collision-prediction system comprises means for inferring and generating 3D geometries of concrete structures from application and/or manipulation process control commanding the 3D robotic concrete printer; and means for using the 3D geometries as a 3D collision model, which allow at any point in time to check if parts of the 3D robotic concrete printer would yield a collision when performing said movement; wherein the motion controller comprises a 3D model of the concrete structure, which is updated in correspondence to the progress of the execution of the process instructions.

By the method and system according to the invention there is generated a 3D model of the print on-the-fly in parallel to the process as basis for model-based collision detection, the system can thus support situations of manual control as well as automated control at any time of process.

In the present disclosure the term 3D robotic concrete printer is understood as a programmable device for 3D concrete application and/or manipulation.

In the present disclosure, the term "concrete" is to be understood as covering all concrete type materials as well as mortar type materials and also recipes with a high content of recycled materials.

By the invention it is realised that the method and system may be used for a variety of different application and/or manipulation processes in relation to concrete 3D printing, whereby the tool of the printer may comprise a print head, a pouring head for pouring concrete or insulation material, a robotic arm application, such as a drilling tool member or the like for performing machining operations, or the like.

Advantageously, the model-based collision-prediction system involves the steps of inferring and generating 3D geometries of concrete structures from applying and/or manipulating concrete structures by commanding the 3D robotic concrete printer, and using the 3D geometries as a 3D collision model, which allow at any point in time to check if parts of the 3D robotic concrete printer would yield a collision when performing said movement. Preferably, the model-based collision-prediction system further involves the further step of combining said generated 3D collision model with supplementary data, in particular as sensor data deriving from laser scans, predefined 3D obstacles, such as from CAD data, or the like.

Furthermore, it is advantageous that the 3D collision model of the concrete structure is developed in parallel to the application and/or manipulation process and is updated in correspondence to the progress of the execution of the process instructions. Hereby, a superior collision avoidance is achieved.

In an embodiment of the invention, the step of moving the tool is performed manually by an operator controlling the movement, by automated operation or by sensor-guided operation. In the context of 3D concrete printing, this could be a manual interruption of the printing process in order to moving the tool for performing a supplemental operation, such as maintenance and cleaning tasks. Accordingly, the printer may comprise a maintenance area for cleaning and/or exchanging the print head or the like.

It is found advantageous that a collision detection step is carried out by the model-based collision prediction system, and whereby the proposed trajectory based on the movements of the 3D robotic concrete printer in response to the motion commands is compared to the corresponding 3D collision model of the concrete structure.

According to the invention, if the model-based collision prediction system predicts a collision using the 3D collision model, potentially harmful commands are rejected. Subsequently or alternatively, collision-free motion commands are generated, either from an algorithm or from further operator input, to circumvent the collision. If the model-based collision prediction system predicts no collision using the 3D collision model, the motion command is executed as intended.

In a preferred embodiment of the invention, the application process is a 3D concrete printing process by moving an extruder tool with a gantry. This involves that the 3D robotic concrete printer is a gantry-type 3D robotic concrete printer moving an extruder tool for depositing concrete in a predetermined printing pattern. The system and method according to the invention are found particularly advantageous in relation to 3D concrete printing by a gantry robot system.

BRIEF DESCRIPTION OF THE FIGURES

In the following the invention is described in more detail with reference to the accompanying drawings, in which.

DETAILED DESCRIPTION OF AN EMBODIMENT

Figure 1:
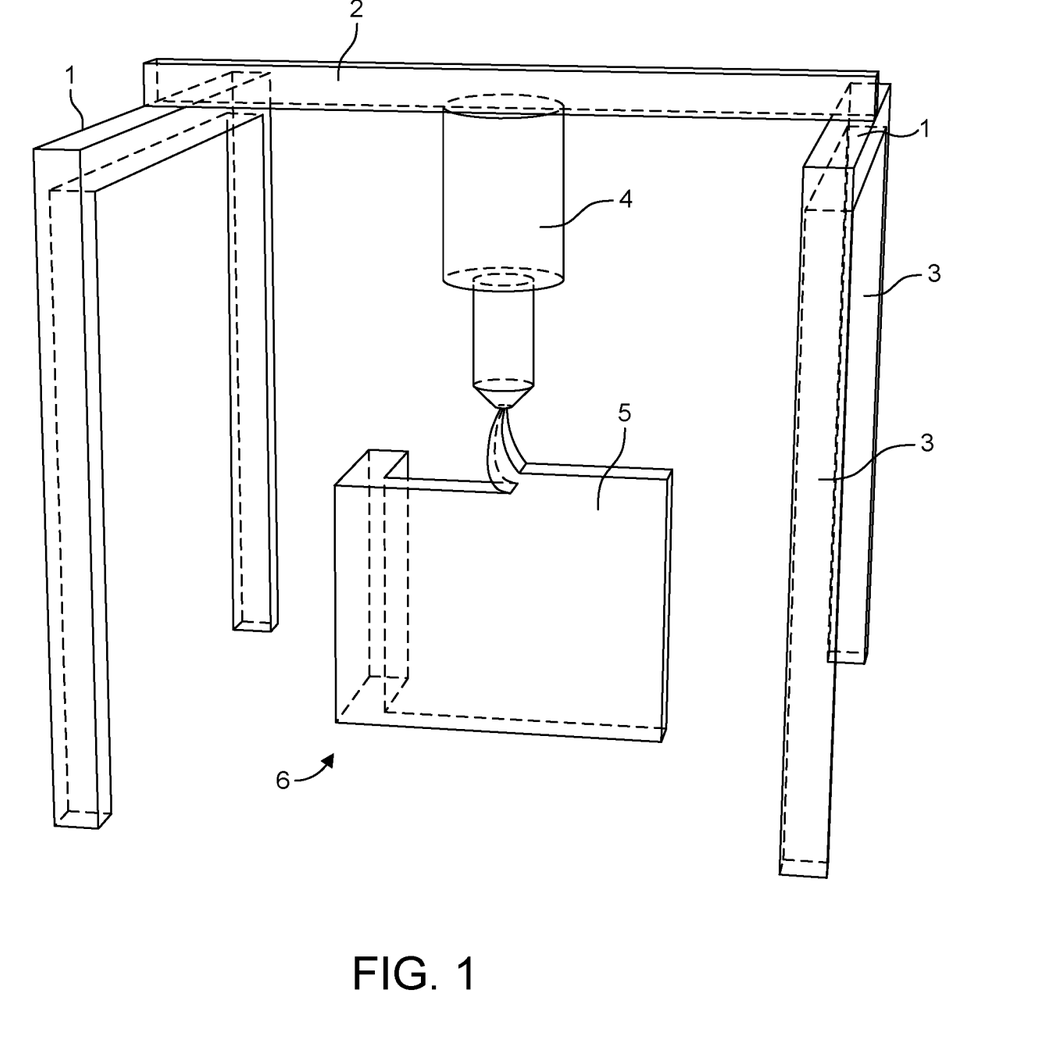
FIG. 1 is a schematic perspective view of a gantry-type 3D robotic concrete printer equipped with a print head, such as an extruder.

In FIG. 1 there is shown an example of a gantry-type 3D robotic concrete printer. The gantry-type printer comprises side beams 1 positioned parallel to each other along the side of the workspace 6 of the 3D printer. Between the side beams 1, a traverse beam 2 is movably positioned with an orientation perpendicular to the side beams 1 so that the traverse beam 2 can move along the side beams 1. The side beams 1 may be supported by vertically oriented corner poles 3 in a manner so that the side beams 1 can be moved up or down the poles 3. On the traverse beam 2, a print head 4, such as an extruder, is moveably arranged. Hereby, a Cartesian system for the 3D printing is provided for concrete printing a building structure 5 on the workspace 6.

One of the advantages of printing with a gantry type printer, is that such gantry-type printer is suitable for printing both larger and smaller buildings, for instance with a working space of approx. 6.8×7.7×5.8 meters (Width× Depth×Height). Printing of storey high walls is not a problem, and also printing a two storey high building is possible.

The gantry-type printers can also print complex, architectural parts with a high degree of detail. The printer can be controlled precisely in X, Y and Z directions and the print head 4 can run at variable speed allowing for slow and fast printing speeds (and even pausing when non-continuous printing is needed). The tools, such as the print head 4, can be exchanged and selected in accordance with the printing process, such that for instance for fine prints with high degree of detail, a smaller nozzle and/or a different extruder nozzle design can be selected in order to meet the challenge of how the concrete material behaves. Accordingly, the tools may be any one of a print head, a pouring head for pouring concrete or insulation material, a robotic arm application, such as a drilling tool member or the like for performing machining operations, or the like.

An advantage with the gantry-type printers in relation to 3D concrete printing on building sites is that this printer type is mobile and can be used in-situ as well as off-site. The printer can be moved.

The movement of the print head tool 4, such as the extruder nozzle depositing concrete material, is controlled during the printing process. As explained above, it is sporadically required to pause the printing process and to move the extrusion tool away from the currently printed structures for maintenance steps, such as cleaning. As this movement interferes with the programmed printing process this can course a risk of the tool colliding with the structure already printed or other obstacles on the site. To avoid this from happening, a collision avoidance system and method is provided.

Figure 2:
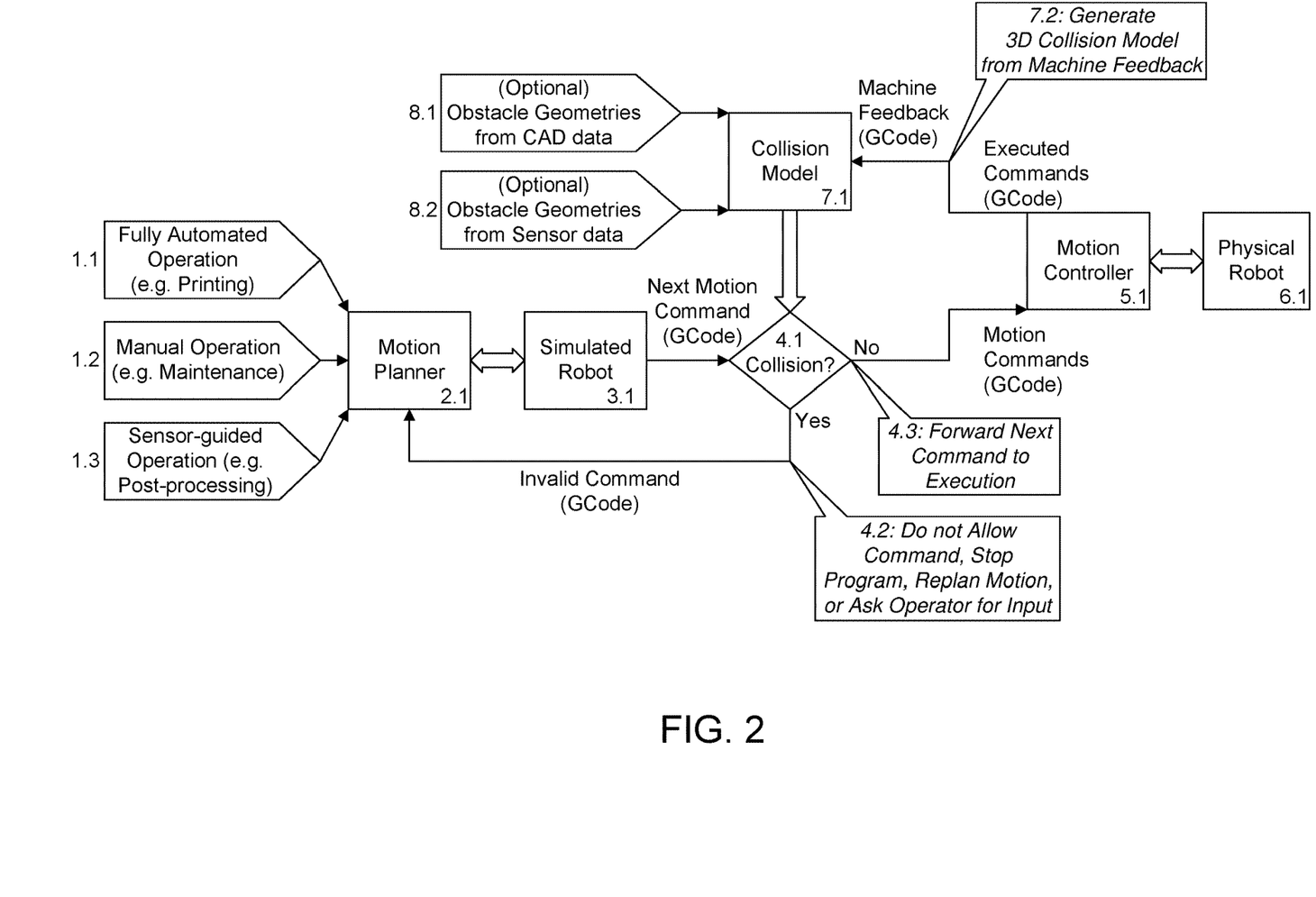
FIG. 2 is a flow-chart of a collision avoidance method according to the invention.

Accordingly, an embodiment of the collision avoidance method is shown in FIG. 2. For automated operation 1.1, an operator starts a given program, e.g. for printing or also for planned maintenance work to be carried out at intervals. For manual operation 1.2 for instance in relation to maintenance, an operator can use a controller, e.g. a game controller with buttons and joysticks. For sensor-guided operation 1.3, a program or manual commands are modified with sensor-data, e.g. laser scans to guide tools to printed structures. In a motion planner 2.1, the outputs of the operations 1.1-3 are mapped and scaled to motions and actions of the gantry. The motions of the print head 4 in the gantry are in the X, Y, Z-axis and angular rotation of the print head and the actions may be extruder on/off. The 3D robotic concrete printer has a last known pose (at time t), which when adding the mapped and scaled motions and actions outputs from the motion planner 2.1 yield a commanded pose (at time t+T). This commanded pose is assumed by a simulated 3D robotic concrete printer geometry 3.1, so that the simulated 3D robotic concrete printer, especially the tool 4 and traverse beam, reflects how the parts of the printer would be positioned at time t+T according to the input. In a step of model-based collision detection 4.1, the geometry of the simulated 3D concrete robotic printer is compared to the geometry of the printed structure, the collision model 7.1. The collision model 7.1 is a 3D model that is developed in parallel to the printing process, thus reflecting it is reflecting the latest progress of the print (7.2). Optionally, other 3D models can be added to the collision model 7.1, e.g. to represent other, static obstacles in the workspace from 3D CAD data 8.1 or sensor data 8.2. Sensor data could come from a sensor connected to the 3D printer that can for example detect unplanned obstacles, such as tools or construction workers. The outcome of the model-based collision detection step 4.1 is leading to a collision reaction: If the geometries of simulated 3DCP system and printed structures (or obstacles) overlap meaning a collision would occur based on the input, this commanded pose is not allowed for execution (4.2). Afterwards, the method jumps back to 2.1 and the motion can for instance be replanned or for example the user can be asked for new input. On the other hand, if the geometries of simulated 3DCP system and printed structures (or obstacles) do not overlap meaning no collision would occur based on the input, this commanded pose is allowed for execution (4.3). All commanded poses allowed for execution are put on a list for execution with the physical gantry. For all commanded poses on this list, GCode is generated by a motion controller 5.1 to communicate the motion to the physical gantry 6.1 for physical execution.

Figure 3:
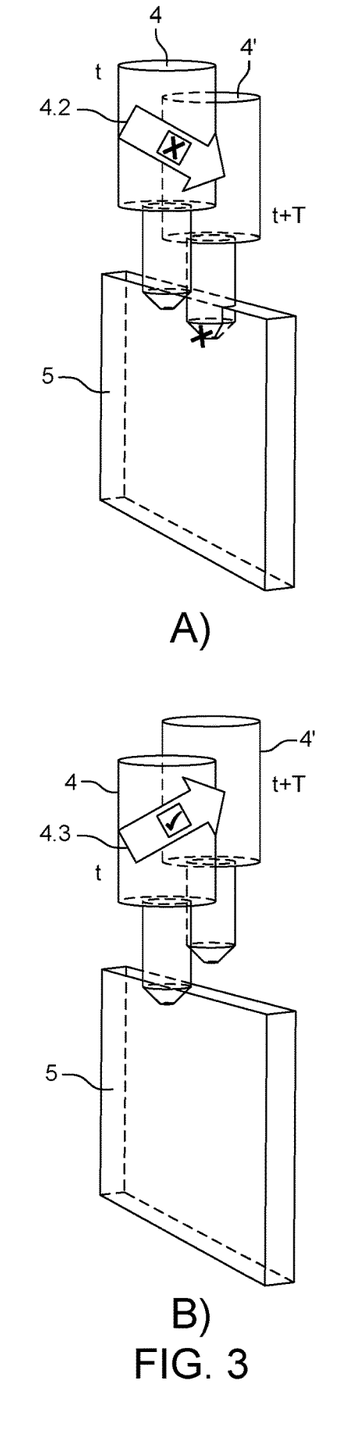
FIG. 3 are illustrations of the 3D collision avoidance during the printing process.

The effect of this method is depicted in FIG. 3, which shows the 3D collision model of the concrete structure during the printing process. On the left in FIG. 3A, there is shown an example of a case with collision (i.e. the step 4.2 in FIG. 2): In the simulation at time t, the print head 4 is located in front of an obstacle 5. A simulated motion tests to position the print head 4' at time t+T, leading to overlapping geometries of the simulated print head 4' and the collision model of the printed structure 5. In consequence, the simulated motion is detected as a collision and will not be allowed. On the right in FIG. 3B, there is shown an example of a case without collision (i.e. step 4.3 in FIG. 2): In the simulation at time t, the print head 4 is located in front of an obstacle 5. A simulated motion tests to position the print head 4' at time t+T, leading to no overlap of geometries of the simulated print head 4' and the collision model of the printed structure 5. In consequence, the simulated motion is detected as without collision and will be allowed and forwarded to execution.

Figure 4:
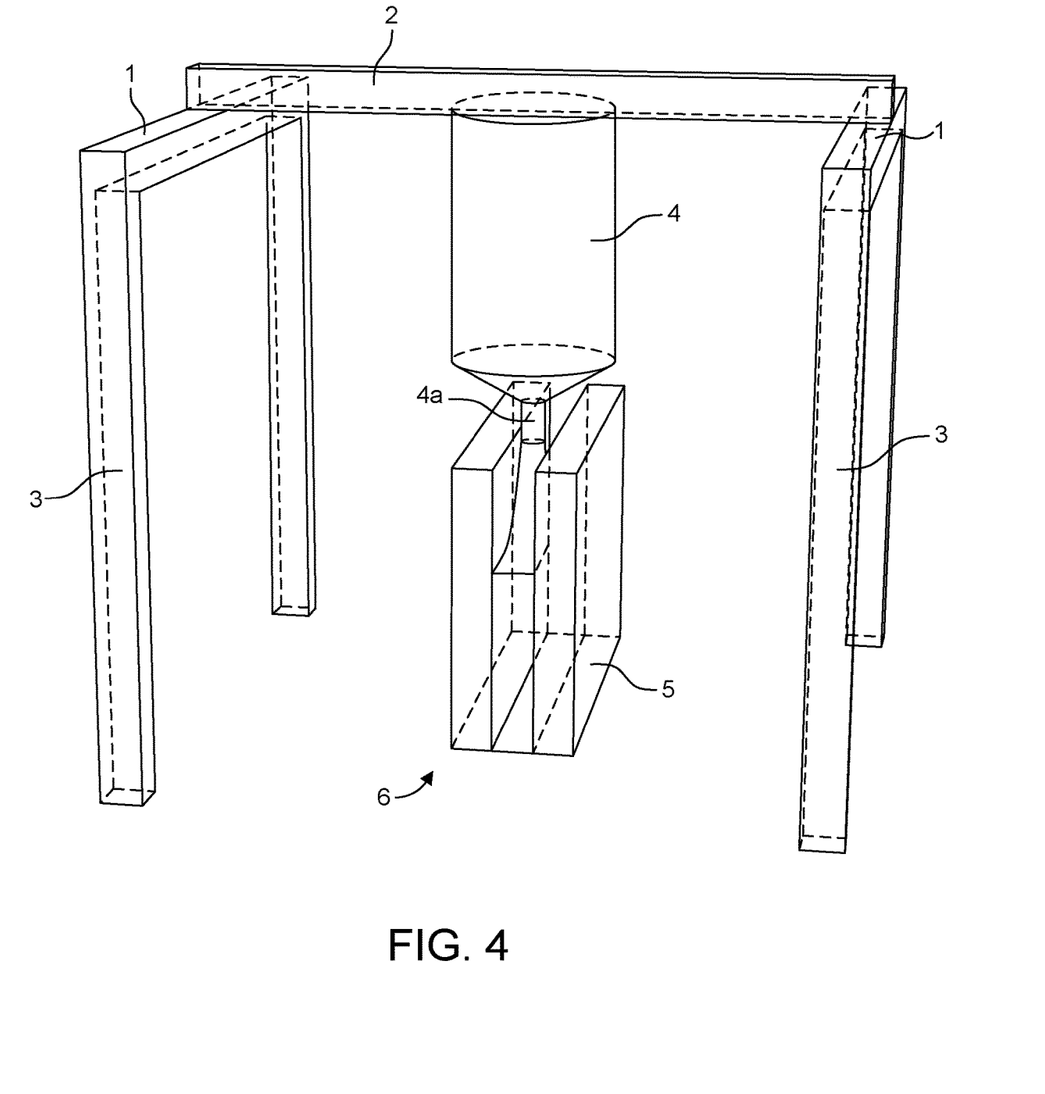
FIG. 4 is a schematic perspective view of a pouring head operating from a gantry-type 3D robotic concrete printer for pouring concrete into printed structures.

In FIG. 4 there is shown a schematic perspective view of an embodiment of the invention, where a pouring head 4a is operated from a gantry-type 3D robotic concrete printer of the type shown in FIG. 1. The print head 4 is here a pouring head 4a from which concrete is poured into printed structures 5.

Figure 5:
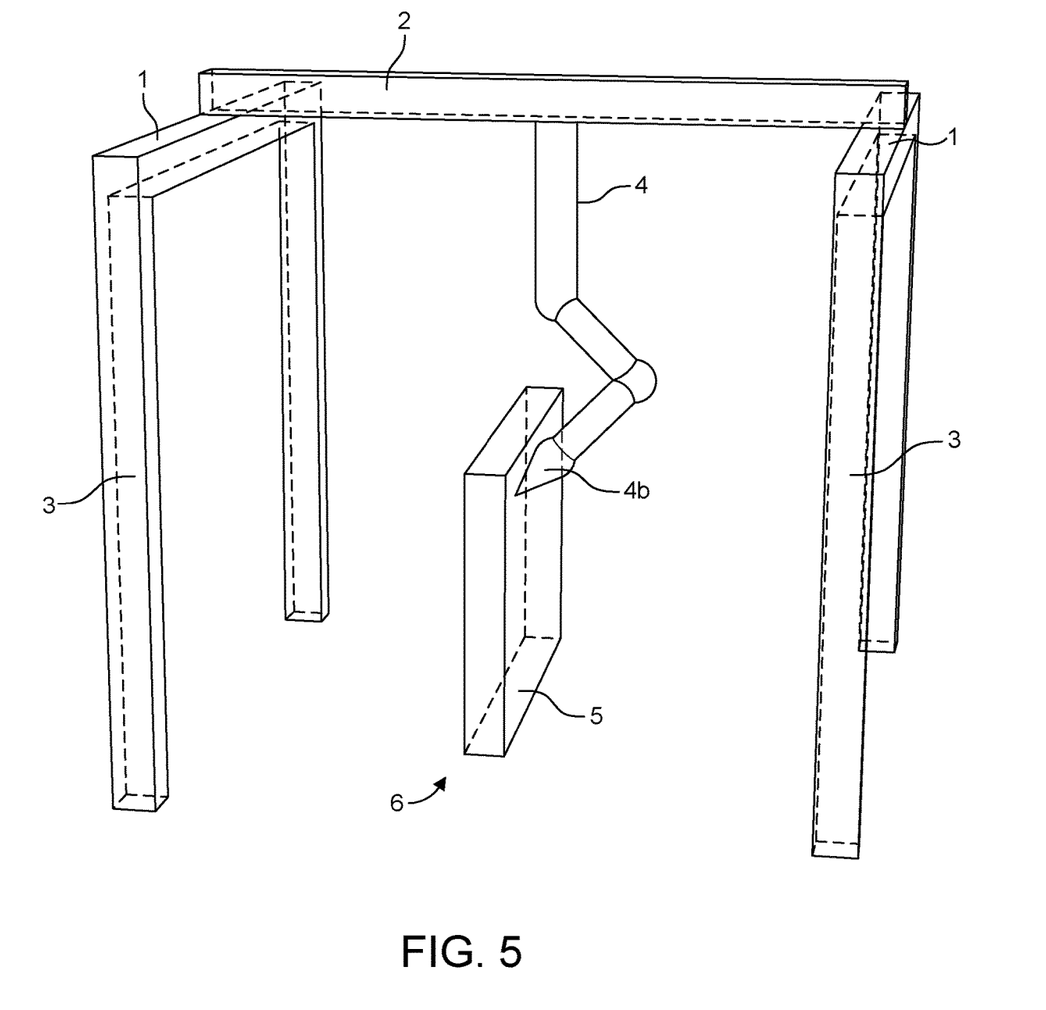
FIG. 5 is a schematic perspective view of a robotic arm operating from a gantry-type 3D robotic concrete printer for manipulation of printed structures, such as drilling.

In FIG. 5 there is shown a schematic perspective view of another embodiment of the gantry-type 3D robotic concrete printer according to the invention, where a robotic arm 4b is operated from the gantry-type 3D robotic concrete printer for manipulation of printed structures 5, such as for performing a drilling operation.

Above the invention is described with reference to some preferred embodiment. However, it is realised by the invention that other embodiments or variants of the above-described examples of a system and a method for collision avoidance of a 3D robotic concrete printer according to the invention may be provided without departing from the accompanying claims.

The invention claimed is:

1. A method for collision avoidance of a 3D robotic concrete printer, whereby the method comprises the steps of:
    performing an application and/or manipulation process by executing instructions, based on G-Code, with a 3D robotic concrete printer by moving a tool in a path for applying and/or manipulating concrete material; and
    moving the tool in response to commands to a motion planner, said movement being assisted by a model-based collision prediction system;
whereby the model-based collision-prediction system involves the steps of inferring and generating 3D geometries of concrete structures from applying and/or manipulating concrete structures by commanding the 3D robotic concrete printer,
    using the 3D geometries as a 3D collision model, which allow at any point in time to check if parts of the 3D robotic concrete printer would yield a collision when performing said movement;
wherein
    the 3D collision model of the concrete structure is developed in parallel to the application and/or manipulation process and is updated in correspondence to the progress of the execution of the process instructions.

2. A method according to claim 1, whereby the step of moving the tool is performed manually by an operator controlling the movement, by automated operation or by sensor-guided operation.

3. A method according to claim 1, whereby a collision detection step is carried out by the model-based collision prediction system, and whereby the proposed trajectory based on the movements of the 3D robotic concrete printer in response to the motion commands is compared to the corresponding 3D collision model of the concrete structure.

4. A method according to claim 1, whereby if the model-based collision prediction system predicts a collision using the 3D collision model, potentially harmful commands are rejected and/or if the model-based collision prediction system predicts no collision using the 3D collision model, the motion command is executed as intended.

5. A method according to claim 1, whereby alternative, collision-free motion commands are generated, either from an algorithm or from further operator input, to circumvent the collision.

6. A method according to claim 1, whereby the application process is a 3D concrete printing process by moving an extruder tool.

7. A system for collision avoidance of a 3D robotic concrete printer, said system comprising
    a motion planner configured to generate motion commands from selectable inputs, as fully automated operation following a given program, manual operation from joysticks and similar input devices for operators, or sensor-based operation configured to move a tool of the printer according to sensor data;

a motion controller configured to interpret motion commands from the motion planner for physical execution on the physical printer; and a model-based collision prediction system configured for testing the motion commands coming from the motion planner for collisions and allowing collision-free motion commands to be executed by the motion controller and not allowing commands that would cause a collision;

wherein the model-based computer program configured to inferring and generating 3D geometries of concrete structures from application and/or manipulation process control commanding the 3D robotic concrete printer; and using the 3D geometries as a 3D collision model, which allow at any point in time to check if parts of the 3D robotic concrete printer would yield a collision when performing said movement;

wherein the motion controller comprises a 3D model of the concrete structure, which is updated in correspondence to the progress of the execution of the process instructions.

8. A system according to claim 7, wherein the tool is any one of a print head, a pouring head for pouring concrete or insulation material, a robotic arm application, a drilling tool member for performing machining operations.

9. A system according to claim 8, wherein the physical printer comprises a maintenance area for cleaning and/or exchanging the print head.

10. A system according to claim 7, wherein the model-based computer program configured to combining said generated 3D collision model with supplementary data, in particular as sensor data deriving from laser scans and/or, predefined 3D obstacles, from CAD data, and wherein supplementary 3D models can be added to the model-based collision prediction system.

11. A system according to claim 10, wherein the supplementary 3D models are digital twins of static obstacles in the workspace of the 3D robotic concrete printer.

* * * * *